(12) United States Patent
Wolfgang et al.

(10) Patent No.: US 8,995,311 B2
(45) Date of Patent: Mar. 31, 2015

(54) RELAYS IN MULTI-USER MIMO SYSTEMS

(75) Inventors: Andreas Wolfgang, Torslanda (SE);
Mikael Coldrey, Landvetter (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 398 days.

(21) Appl. No.: 12/919,103

(22) PCT Filed: Feb. 24, 2009

(86) PCT No.: PCT/SE2009/050202
§ 371 (c)(1),
(2), (4) Date: Aug. 26, 2010

(87) PCT Pub. No.: WO2009/108116
PCT Pub. Date: Sep. 3, 2009

(65) Prior Publication Data
US 2011/0002244 A1    Jan. 6, 2011

Related U.S. Application Data

(60) Provisional application No. 61/031,030, filed on Feb. 25, 2008.

(51) Int. Cl.
*H04J 3/00* (2006.01)
*H04J 3/08* (2006.01)
*H04B 7/26* (2006.01)
*H04L 5/16* (2006.01)
*H04W 72/04* (2009.01)
(Continued)

(52) U.S. Cl.
CPC ............ *H04B 7/2656* (2013.01); *H04B 7/2606* (2013.01); *H04L 5/16* (2013.01); *H04W 72/04* (2013.01); *H04W 72/082* (2013.01); *H04W 88/04* (2013.01); *H04B 7/024* (2013.01)
USPC .......................................... 370/280; 370/315

(58) Field of Classification Search
CPC .... H04B 7/2606; H04B 7/2656; H04B 7/026; H04B 7/15592; H04B 7/0413–7/0486; H04L 5/16; H04L 1/06–1/0693; H04W 72/04
USPC .................. 370/310.2, 276–296, 310–350
See application file for complete search history.

(56) References Cited

U.S. PATENT DOCUMENTS

| 6,512,481 | B1 * | 1/2003 | Velazquez et al. ............ 342/367 |
| 7,406,060 | B2 * | 7/2008 | Periyalwar et al. ........... 370/328 |

(Continued)

OTHER PUBLICATIONS

Salah, A., et al.; "On the Linear Precoding of Non-Orthogonal STBC for Correlated MIMO Channel,". IEEE 18$^{th}$ International Symposium on Personal, Indoor and Mobile Radio Communications, 2007. PIMRC 2007; France.

(Continued)

*Primary Examiner* — Thai Hoang
*Assistant Examiner* — Kenneth P Hunt

(57) ABSTRACT

A method for signalling in a MIMO system. The system comprises a base station (BS), and at least one relay station (RS), operating in half duplex realized using Time Division Duplex. The BS and the RS distribute channels to at least one mobile station (MS), The method is particularly characterized in the steps where:-the BS selects at least one RS which is served during a first time slot (TS1), and selects at least one MS which is served during a second time slot (TS2),—the BS creates channels during T1 to said RS,—the BS and said RS create channels during T2 to said MS.

15 Claims, 3 Drawing Sheets

(51) Int. Cl.
*H04W 72/08* (2009.01)
*H04W 88/04* (2009.01)
*H04B 7/02* (2006.01)

(56) References Cited

U.S. PATENT DOCUMENTS

| | | | |
|---|---|---|---|
| 7,502,407 B2 * | 3/2009 | Sakata et al. | 375/211 |
| 7,594,010 B2 * | 9/2009 | Dohler et al. | 709/224 |
| 7,720,020 B2 * | 5/2010 | Larsson | 370/315 |
| 7,746,822 B2 * | 6/2010 | Xue et al. | 370/328 |
| 7,751,775 B2 * | 7/2010 | Baier et al. | 455/7 |
| 7,778,598 B2 * | 8/2010 | Devroye et al. | 455/13.4 |
| 7,944,809 B2 * | 5/2011 | Kim et al. | 370/208 |
| 8,130,862 B2 * | 3/2012 | Forenza et al. | 375/295 |
| 8,150,409 B2 * | 4/2012 | Kim et al. | 455/452.2 |
| 8,213,314 B2 * | 7/2012 | Chindapol et al. | 370/236 |
| 2004/0131025 A1 * | 7/2004 | Dohler et al. | 370/328 |
| 2006/0008022 A1 * | 1/2006 | Wight | 375/267 |
| 2006/0270363 A1 * | 11/2006 | Sandhu et al. | 455/101 |
| 2007/0081502 A1 | 4/2007 | Lee et al. | |
| 2007/0086512 A1 | 4/2007 | Can et al. | |
| 2008/0025248 A1 * | 1/2008 | Naden | 370/321 |
| 2009/0086666 A1 * | 4/2009 | Guvenc et al. | 370/328 |
| 2009/0147728 A1 * | 6/2009 | Atia et al. | 370/321 |
| 2009/0175214 A1 * | 7/2009 | Sfar et al. | 370/315 |
| 2009/0196214 A1 * | 8/2009 | Li et al. | 370/315 |
| 2012/0087382 A1 * | 4/2012 | Zhang et al. | 370/480 |

OTHER PUBLICATIONS

Wang, et al. Distributed Channel Access Scheduling for Ad Hoc Networks using Virtual MIMO. Computer Communication and Networks, 2007. ICCCN 2007. Proceedings of the 16$^{th}$ International Conference on, IEEE. Aug. 1, 2007.

* cited by examiner

RELAYS IN MULTI-USER MIMO SYSTEMS

This application claims the benefit of U.S. Provisional Application No.61/031,030, filed Feb. 25, 2008, the disclosure of which is fully incorporated herein by reference.

TECHNICAL FIELD

The present invention relates to a method for signalling in a MIMO system comprising a base station, BS, and at least one relay station, RS, operating in half duplex realized using Time Division Duplex. The BS and the RS distributes channels to at least one mobile station, MS. The present invention also relates to a BS being arranged to perform said method.

BACKGROUND

Wireless systems, utilizing services such as mobile telecom, radio systems or wireless networks may use multiple antennas at the Base-Station (BS) to support multiple Mobile-Stations (MSs) at the same time and on the same frequency. The signal separation of the MSs is achieved in the spatial domain. Such a system is often referred to as a Multi-User (MU) Multiple-Input Multiple-Output (MIMO) system.

In this document an antenna is assumed to be a port, which is accessible for the transmission/reception of a wireless signal. This not necessarily needs to be a physical antenna. A physical antenna, might for example support two polarizations and therefore provide two accessible ports. In our notation these two ports are referred to as two antennas.

A key issue with MU-MIMO as well as other communication systems is the fairness concerning the resources allocated to different MSs. If a system was to maximize the total throughput, the BS would preferably serve MSs, which have a good channel quality, while discarding MSs with a bad channel quality. This near-far effect results in a non-uniform distribution of the available throughput over a communication cell.

A potential solution to this problem could be to increase the density of BSs in the system. Increasing the number of BS stations however becomes increasingly difficult since available sites are rare and costly. Relay Stations (RSs) are seen as a possibility to counter act the non-uniform distribution of system resources over the cell area, while avoiding the deployment of additional BSs. RSs have the advantage that they can be made small in size and do not require a back-haul connection. In addition, RSs may be used for extending the coverage of a communication system.

Relay based communication has been discussed in earlier works such as US 2007/0165581 A1, US 2008/0267111 A1, and US 2007/0190034 A1 These works however only treat the problem of communication between a single source (in this case the BS) and a single destination (in this case the MS) via RS(s). In US 7406060BB a MIMO based relay system is proposed, which focuses on the uplink of a communication system. Other related publications considering the transmission of signals from the BS to multiple MSs via RS(s), rely on the assumption that there is no direct signal path between the BS and the MS(s). Such documents are:

Tetsushi Abe, Hui Shi, Takahiro Asai, and Hitoshi Yoshino, "Relay techniques for mimo wireless networks with multiple source and destination pairs," EURASIP J. Wire!. Commun. Netw., vol. 2006, no. 2, pp. 37-37, 2006.

A. Wittneben, "Coherent multiuser relaying with partial relay cooperation," in IEEE Wireless Communications and Networking Conference, WCNC, 2006, vol. 2, pp. 1027-1033.

Lingfan Weng and R. D. Murch, "Multi-user MIMO Relay System with Selfinterference Cancellation," in Wireless Communications and Networking Conference, 2007.WCNC 2007. IEEE, Kowloon, Mar. 11-15, 2007, pp. 958-962.

Taiwen Tang, R. W. Heath, Robert W. Heath, and Sunghyun Cho, "On Achievable Sum Rates of A Multiuser MIMO Relay Channel," in Information Theory, 2006 IEEE International Symposium on, Seattle, Wash., July 2006, pp. 1026-1030.

Practical considerations such as the limited size of RSs generally require that RSs operate in a half-duplex mode. This half-duplex mode may be realized using Time-Division Duplex (TDD), i.e., a RS can receive in one time-slot and transmit in the next time-slot. Half-duplex operation of RSs in general results in an effective throughput-loss over the relay link of 50%, since the RS uses two time-slots to deliver its data to the receiver. During the second time-slot the BS even might be prevented from transmitting at all to avoid interference with the relay, which results in a further throughput loss.

Let us for example assume an area in a communication cell with bad signal quality and/or a high density of MSs. Given such an area the BS in a conventional communication system faces the problem of allocating resources to MSs in this area without wasting power and penalizing other MSs in the cell. If half-duplex RSs would be deployed to serve MSs in this area, system resources such as time-slots/frequency are blocked by the relay-link and the total system capacity would be decreased. Again other MSs are penalized.

SUMMARY

The object of the present invention is to solve above mentioned problems and facilitate the use of half duplex Time Division Duplex relays in a communication system without having the typical duplex-loss.

This is solved by means of a method for signalling in a MIMO system. The system comprises a base station, BS, and at least one relay station, RS, operating in half duplex realized using Time Division Duplex. The BS and the RS distribute channels to at least one mobile station, MS. The method is particularly characterized in the steps where:

the BS selects at least one RS which is served during a first time slot, T1, and selects at least one MS which is served during a second time slot, T2, the BS creates channels during T1 to said RS, the BS and said RS create channels during T2 to said MS.

This is also solved by means of a base station, BS, being arranged to signal in a MIMO system. The system comprises the base station, BS, and at least one relay station, RS, being arranged to operate in half duplex realized using Time Division Duplex. The BS and the RS are arranged to distribute channels to at least one mobile station, MS. The BS is particularly characterized in that:

the BS is arranged to select at least one RS which is served during a first time slot, T1, and selects at least one MS which is served during a second time slot, T2, the BS is further arranged to create channels during T1 to said RS, the BS and said RS is further arranged to create channels during T2 to said MS.

This invention allows distributing system resources over a communication cell area with the aid of half-duplex RSs. Since the RSs are used as part of a cooperative MU-MIMO system, the throughput loss associated with standard half-duplex RSs can be avoided. Furthermore, if amplify-and-forward RSs are considered, they will be completely transparent to the MSs. This in turn means that only the BS needs to be aware of the fact that RSs are used, which substantially simplifies their deployment in existing communication systems.

BRIEF DESCRIPTION OF THE DRAWINGS

In the following text the invention will be described in detail with reference to the attached drawings. These drawings are used for illustration only and do not in any way limit the scope of the invention.

DETAILED DESCRIPTION

Figure 1:
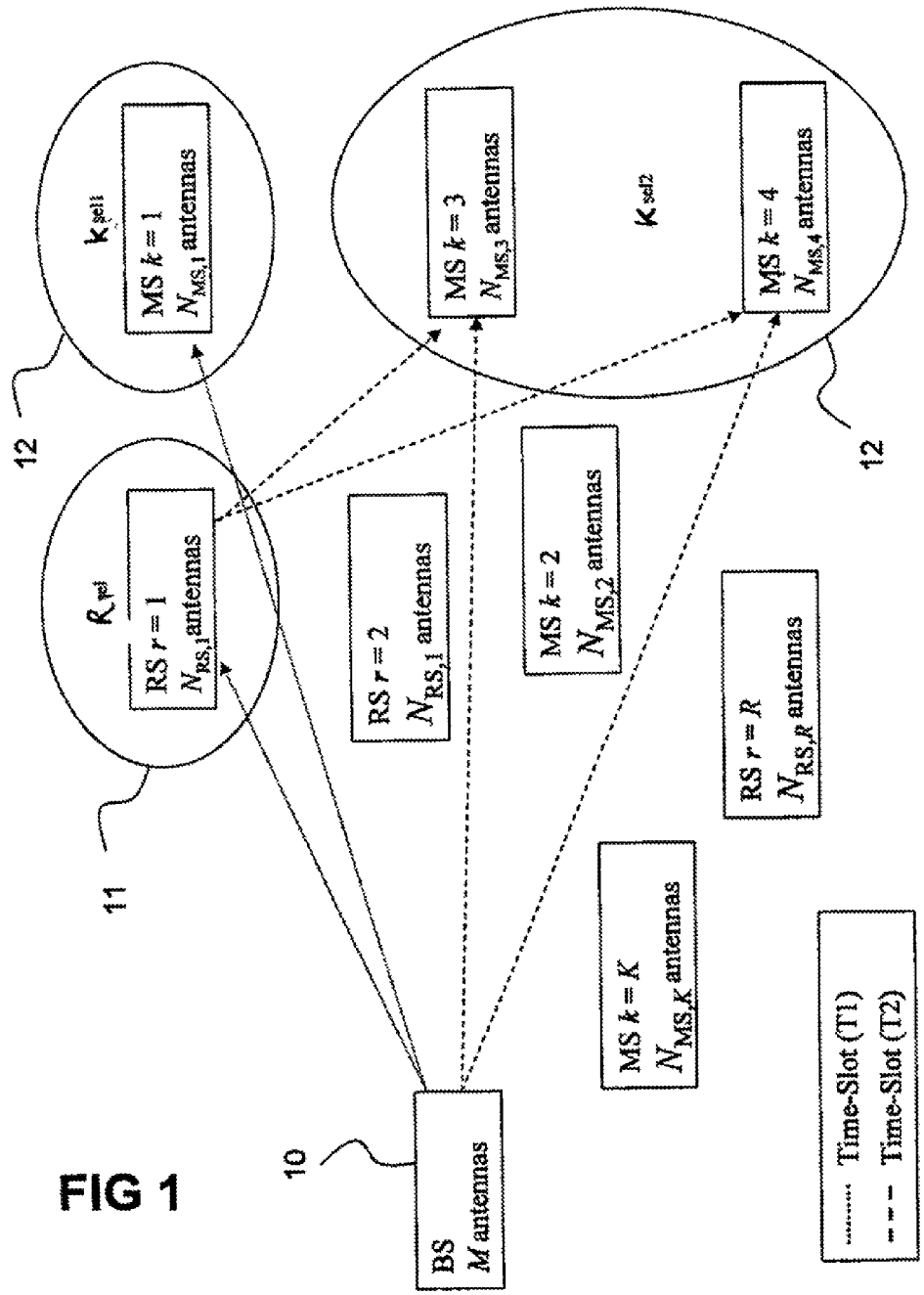
FIG. 1 illustrates a relay-assisted MIMO system.

The invention will now be described in detail with reference to embodiments described in the detailed description and shown in the drawings. The embodiments of the invention with further developments and described in the following are to be regarded only as examples and are in no way to limit the scope of the protection provided by the patent claims.

It should be realized that a base station (BS), according to FIG. 1, performing the method steps described in the following, is arranged to perform said step. The BS is therefore also described in the following.

Note that Italic letter x represents scalar variable, that bold lower case letter x represents vector of scalars, that bold, upper case letter X represents matrix of scalars, that calligraphic letters X represents a set of objects and that |X| represents cardinality of the set X.

The invention relates to a method for signalling in a MIMO system, the system comprising a base station (BS) and at least one relay station (RS) operating in half duplex realized using Time Division Duplex, wherein the BS and the RS distributes channels to at least one mobile station (MS).

According to an illustrative embodiment, the system considered consists, see FIG. 1, of at least one BS 10, R number of RS 11 and K number of MS 12, the MS being a user entity such as a mobile phone. The BS uses M antennas, the rth RS uses $N_{RS,r}$ antennas, while the kth MS uses $N_{MS,k}$ antennas, as indicated in FIG. 1. The relay stations (RSs) are assumed to operate in TDD (Time Division Duplex) mode, i.e receive in one time-slot (T1) and retransmit the signal in the next time-slot (T2).

Figure 3:
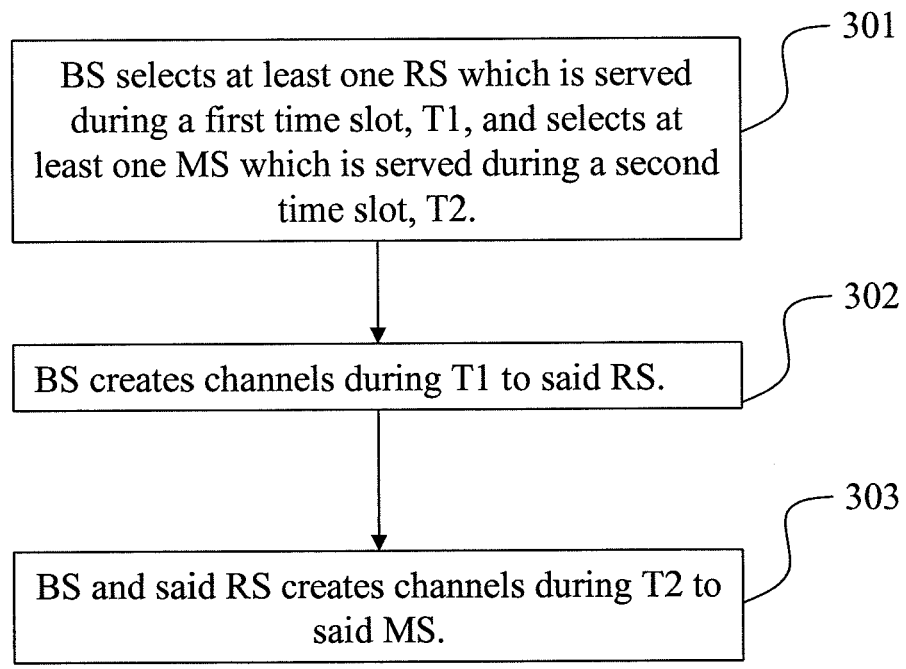
FIG. 3 illustrates a scheme for the method according to the present invention.

In a first method step according to the present invention, the BS 10 selects 301 (see FIG. 3) at least one RS 11 which is served during a first time slot (T1) and selects at least one MS 12 which is served during a second time slot (T2). The BS may also select at least one MS which is served during T1, wherein the BS creates channels during T1 to said second MS. The MS selected during T1 may be the same as the MS selected during T2.

Creating a channel is defined to mean establishins a session in which data s transmitted.

According to an illustrative embodiment, the BS 10 in the first step selects a set of $K_{sel1}$, MSs 12 and $R_{sel}$ RSs 11, which are served during the first time-slot T1. Similarly a set of mobile stations (MSs) $K_{sel2}$, which is served during the second time-slot T2, is selected. The cardinalities of the three sets are $K_{sel1}$ $R_{sel}$ and $K_{sel2}$, respectively.

According to the method, the channels are interference free channels created using multi-user MIMO techniques, i.e the channels are spatially separated. This means that the BS 10 selects each RS 11 and each MS 12 jointly such that the BS can create interference-free channels to each selected MS. Creating channels means to create interference free channels using MU-MIMO techniques.

In order to achieve a good performance the MSs and the RSs are selected such that the BS can efficiently create interference-free channels to the different MSs. The right selection of the RSs and MSs to be served is crucial for good performance. In this document we assume that there exists an algorithm, which can select the MSs and RS which optimize a certain cost-function.

According to the present invention, the transmission to the selected MS 12 and RS 11 is now divided into two time-slots. In T1, the BS 10 creates 302 (see FIG. 3) channels to said (selected) RS 11. In the illustrative embodiment, the BS during the first time-slot T1 creates interference free channels to all MSs and RSs in $K_{sel1}$ and $R_{sel}$, respectively. This is indicated by the dotted lines in FIG. 1. It implies that the BS considers the RSs as additional MSs during this first timeslot T1.

According to the present invention, the BS 10 and said (selected) RS 11 in the second time slot T2 creates 303 (see FIG. 3) channels to said MS 12. Said RS (or RSs) in the second time-slot T2 are considered to be part of a distributed transmit antenna array, which is compromised of the BS's plus the as indicated by the dashed lines in FIG. 1. The interference free channels to the MSs in $K_{sel2}$ are again created using MU-MIMO techniques.

The basic concept of this invention is consequently that the BS 10 considers the RSs 11 as additional MSs 12 during the first time-slot (T1) and creates interference free channels to these RSs using MU-MIMO techniques. In the second time-slot (T2) the RSs selected from the first time-slot as well as the BS are considered as one large distributed antenna array.

In the following example it will be shown how the throughput loss associated with the RSs 11 TDD mode can be avoided when using them as part of a MU-MIMO system. As will be shown, the loss in throughput due to serving RSs in the first time-slot is compensated for by the fact that during the second time-slot the distributed antenna array compromised of BS 10 and RSs supports a higher number of MSs. The number of MSs 12 supported during T2 is higher than during T1.

Number of Supported MSs

Assume a BS 10, which uses linear processing and employs M transmit antennas. For notational simplicity we assume that each RS 11 as well as each MS 12 use N antennas. All RSs 11 operate in TDD mode. With its M transmit antennas, the BS 10 can serve at most a total of M receive antennas with interference-free channels. If the BS decides to schedule $R_{sel}=|R_{sel}|$ RSs as part of the down-link, then the maximum number of MSs, which can be scheduled during the first time-slot T1 is given as:

$$K_{max,1} = \frac{M - R_{sel}N}{N} \tag{1}$$

During the second time-slot, the BS 10 and the scheduled RSs 11 together form one distributed antenna array having $M+R_{sel}N$ antennas. The maximum number of MSs 12 supported during the second time-slot is therefore given as:

$$K_{max,2} = \frac{M + R_{sel}N}{N} \tag{2}$$

The total number of MSs 12 for the two time-slots is thus given as:

$$K_{max} = K_{max,1} + K_{max,2} = \frac{2M}{N} \quad (3)$$

which is independent of the number of RSs 11 used. The total number of MSs 12 which can be served (scheduled) over T1 and T2 is consequently independent of the number of RS. Moreover, no matter whether RSs are scheduled or not, the maximum number of MSs, which can be scheduled over two time-slots is independent of the number of RSs. If RSs are used however, the channel quality of the scheduled MSs can be substantially increased.

As shown in equation 2, the number of channels created to said RS 11 during T1 is made available to said MS 12 during T2. As also shown in equations 1-3, all created channels are constant over both T1 and T2.

Linear Processing (3.2)

In the next example it is shown how a relay aided MU-MIMO system can be realized using linear processing at the BS 10. A person skilled in the art would realize that since the RS 11 uses linear processing when forwarding the signals received from the BS, said RS is an amplify- and forward relay station using. Moreover, as will be described in this example, the BS uses linear pre-coding to create interference-free channels.

Assume again that all RSs 11 and all MSs 12 each employ N antennas, while the BS 10 uses M antennas. Furthermore we assume that the BS scheduler has selected a set of MSs $K_{sel1}$ and a set of RSs $R_{sel}$, which are served during the first time-slot T1. For the second time-slot T2 a set of MSs $K_{sel2}$ is selected.

Since the RSs 11 operate in TDD mode the BS 10 optimizes its transmit signal over two time-slots. The data transmitted from the BS is therefore buffered, then pre-coded by the BS with the aid of a modulation matrix to achieve interference free channels and then transmitted. All RSs listen during the first time-slot T1, then multiply the signal with a complex gain matrix G and retransmit the signals. The noise at the RSs is neglected in this example for simplicity. All channels are assumed to be narrow-band and constant over both time-slots.

During the first time-slot T1 the signal, which is received by the MSs 12 in the set $K_{sel1}$ as well as by the RSs 11 in the set $R_{sel}$, can be expressed as:

$$y_1 = H_1 x_1 \quad (4)$$

where $y_1 = [y_{MS,1}^T, \ldots, y_{MS,K_{sel1}}^T, y_{RS,1}^T, \ldots, \ldots, y_{RS,R_{sel}}^T]^T$
$H_1 = [H_{MS,1}^T, \ldots, H_{MS,K_{sel1}}^T, H_{RS,1}^T, \ldots, \ldots, H_{RS,R_{sel}}^T]^T$ where $y_{MS,i}$ is the signal received by the ith MS 12 in the set $K_{sel1}$, $y_{RS,i}$ is the signal received by the ith RS 11 in the set $R_{sel}$, $H_{MS,i}$ is the channel between the BS 10 and the ith MS, while $H_{RS,i}$ is the channel between the BS and the ith RS. The transmit signal $x_1$ is defined as:

$$x_1 = F_1 s^{(1)} \quad (5)$$

where $F_1$ is a modulation matrix and $s^{(1)}$ will be defined at the end of this example. We now can write:

$$y_1 = H_1 F_1 s^{(1)} \quad (6)$$

where $F_1$ is constructed using block-diagonalization as proposed in Q. H. Spencer, A. L. Swindlehurst, and M. Haardt, "Zero-forcing methods for downlink spatial multiplexing in multiuser MIMO channels," IEEE Transactionson Signal Processing, vol. 52, no. 2, pp. 461-471, February 2004. Such that:

$$H_1 F_1 = \begin{bmatrix} \tilde{H}_{MS,1} & & & & 0 \\ & \ddots & & & \\ & & \tilde{H}_{MS,K_{sel1}} & & \\ & & & \tilde{H}_{RS,1} & \\ 0 & & & & \ddots \\ & & & & & \tilde{H}_{RS,R_{sel}} \end{bmatrix}$$

is a block diagonal matrix. This results in interference-free channels to all MSs 12 and RSs 11, which are scheduled in the first time-slot (T1). Analogous to the first time-slot, the signal received by the MSs during the second time-slot (T2) can be expressed as:

$$y_2 = H_2 x_2 \quad (7)$$

where $y_2 = [y_{MS,1}^T, \ldots, y_{MS,K_{sel2}}^T]^T$ with $y_{MS,i}$ being the signal received by the ith MS 12 in the set $K_{sel2}$. The channel matrix H2 can be expressed as:

$$H_2 = \begin{bmatrix} H_{MS,1} & C_{11} & \ldots & C_{1R_{sel}} \\ \vdots & & & \vdots \\ H_{MS,K_{sel2}} & C_{K_{sel2}1} & \ldots & C_{K_{sel2}R_{sel}} \end{bmatrix}$$

where the compound channel between the BS 10 and the ith MS 12, via the jth RS 11 can be expressed as:

$$C_{ij} = H_{MS,ij} G_j \tilde{H}_{RS,j}$$

with $H_{MS,ij}$ being the channel between the ith MS 12 and the jth RS 11, which is characterized by the forwarding-matrix $G_j$. $H_2$ can again be block-diagonalized using a modulation matrix $F_2$.

The signals transmitted in the two different time-slots $x_1$ and $x_2$ can now be constructed as follows.

$$\begin{bmatrix} x_2 \\ x_{RS} \end{bmatrix} = F_2 s^{(2)} = F_2 \begin{bmatrix} s_1^{(2)} \\ \vdots \\ s_{K_{sel2}}^{(2)} \end{bmatrix} \quad (8)$$

where $s_i^{(2)}$ is the symbol vector, which is intended for the ith MS 12 in $K_{sel2}$ during the second time-slot (T2). The signal transmitted during the first time-slot (T1) is given as:

$$x_1 = F_1 s^{(1)} = F_1 \begin{bmatrix} s_1^{(1)} \\ \vdots \\ s_{K_{sel1}}^{(1)} \\ x_{RS} \end{bmatrix} \quad (9)$$

where $s_i^{(1)}$ is the symbol vector, which is intended for the ith MS 12 of $K_{sel1}$ during the first time-slot (T1). The signal transmitted to the RS 11 during the first time-slot $x_{1,RS}$ was calculated in Eqn. (8). The BS 10 first calculates the signals transmitted in time-slot one and two according to Eqns. (8)-

Figure 2:
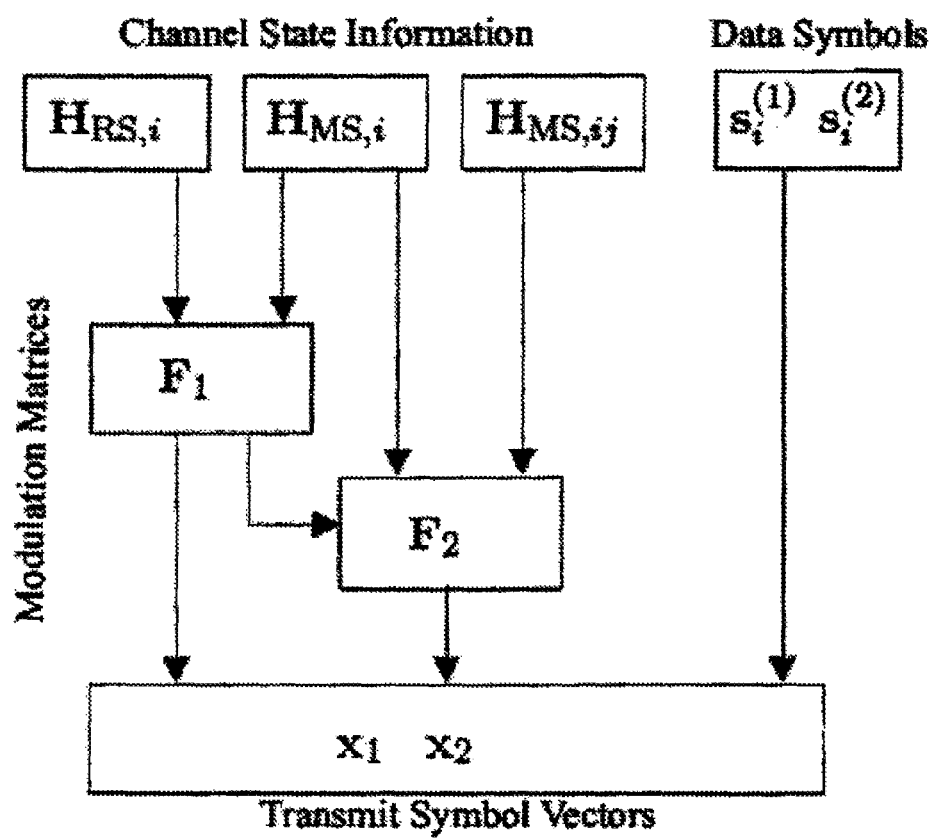
FIG. 2 illustrates transmit symbol vector calculation.

(9), and then transmits the signals. Both signals have to be jointly optimized. All steps of how the transmit signals are calculated in this example are summarized in FIG. 2, which again shows the dependence of $F_2$ on $F_1$.

As been described herein, the object of the present invention is to facilitate the use of half duplex Time Division Duplex relays in a communication system without having the typical duplex-loss. This is achieved by combining MU-MIMO techniques with cooperative transmission between RSs 11 and BS 10, which has also been described herein with reference to an illustrative embodiment.

This invention addresses the problem of throughput loss induced by the use of half duplex RSs 11. It allows for the deployment of small-sized half-duplex RSs 11 to distribute channel resources over the communication-cell area, without penalizing the total system throughput. Here, to distribute channel resources over the cell area means to move them where they are needed. This can be either an area with high MS 12 density or an area, where without RSs the signal quality is very poor. In this invention it is assumed that the RSs use TDD, i.e., the RSs receive their signals in one time-slot (T1), then process the signal and re-transmit it during the second time-slot (T2). The task of the BS 10 is to optimize the use of the RSs in the down-link as part of a MU-MIMO system.

The invention claimed is:

1. A method for signalling in a MIMO system, the system comprising a base station (BS), and a plurality of relay stations (RSs) operating in half duplex realized using Time Division Duplex, wherein the BS and the RS distribute channels to a plurality of mobile station (MSs), the method comprising:
   the BS selects RSs which are served during a first time slot, T1, and selects a plurality of MSs which are served during a second time slot, T2, wherein, in the second time slot, T2, the RSs selected from the first time slot and the BS are considered as one distributed antenna array comprising antenna arrays for both the BS and the RSs, and to the BS the RSs are additional MSs during the first time slot, T1,
   the BS creates interference free channels during T1 to said RSs, and
   the BS and said RSs create channels during T2 to said MSs, wherein the RSs and the MSs are selected jointly to facilitate using MIMO techniques in the creation of the channels during T1 and T2.

2. The method according to claim 1 wherein the BS also selects at least one MS which is served during T1, wherein the BS creates channels during T1 to said MS.

3. The method according to claim 2 wherein the MS selected during T1 is the same as the MS selected during T2.

4. The method according to claim 1 wherein said RS is an amplify—and forward relay station using linear processing when forwarding received signals.

5. The method according to claim 1 wherein the BS uses linear pre-coding to create interference-free channels.

6. The method according to claim 1 wherein the number of MSs supported during T2 is higher than during T1.

7. The method according to claim 6 wherein the number of channels created to said RS during T1 are made available to said MS during T2.

8. The method according to claim 6 wherein the total number of MSs which can be served over T1 and T2 is independent of the number of RS.

9. The method according to claim 1 wherein the BS selects each RS and each MS jointly such that the BS can create interference-free channels to each selected MS.

10. The method according to claim 1 wherein the number of created channels are constant over both T1 and T2.

11. A Base station (BS), being arranged to signal in a MIMO system, the system comprising the base station (BS), and a plurality of relay stations, being arranged to operate in half duplex realized using Time Division Duplex, wherein the BS and the RSs are arranged to distribute channels to a plurality of mobile stations (MSs), wherein:
   the BS is arranged to select the plurality of RSs which are served during a first time slot (T1), and selects the plurality of MSs which are served during a second time slot (T2), wherein, in the second time slot, T2, the RSs selected from the first time slot and the BS are considered as one distributed antenna array comprising antenna arrays for both the BS and RSs, and to the BS the RSs are additional MSs during the first time slot, T1,
   the BS is further arranged to create interference free channels during T1 to said RSs,
   the BS and said at least one RSRSs are further arranged to create channels during T2 to said MSs,
   wherein the RSs and MSs are selected jointly to facilitate using MIMO techniques in the creation of the channels during T1 and T2.

12. The base station, BS, according to claim 11 wherein the BS is further arranged to also select at least one MS which is served during T1, wherein the BS is arranged to create channels during T1 to said MS.

13. The base station, BS, according to claim 11 wherein the BS is further arranged to use linear pre-coding to create interference-free channels.

14. The base station, BS, according to claim 11 wherein the BS is arranged to select each RS and each MS jointly such that the BS can create interference-free channels to each selected MS.

15. The base station, BS, according to claim 11 wherein said RS is an amplify—and forward relay station using linear processing when forwarding received signals.

* * * * *